(12) United States Patent
Konoura et al.

(10) Patent No.: US 12,099,621 B2
(45) Date of Patent: Sep. 24, 2024

(54) COMPUTER SYSTEM, DATA CONTROL METHOD, AND STORAGE MEDIUM

(71) Applicant: Hitachi, Ltd., Tokyo (JP)

(72) Inventors: Hiroaki Konoura, Tokyo (JP); Mayuko Takai, Tokyo (JP); Yu Nakata, Tokyo (JP); Masafumi Kinoshita, Tokyo (JP); Keisuke Shirai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 17/275,551

(22) PCT Filed: Mar. 17, 2020

(86) PCT No.: PCT/JP2020/011853
§ 371 (c)(1),
(2) Date: Mar. 11, 2021

(87) PCT Pub. No.: WO2021/059564
PCT Pub. Date: Apr. 1, 2021

(65) Prior Publication Data
US 2021/0390197 A1    Dec. 16, 2021

(30) Foreign Application Priority Data
Sep. 25, 2019  (JP) .................................. 2019-174473

(51) Int. Cl.
*G06F 21/62*    (2013.01)
*G06F 21/31*    (2013.01)
(Continued)

(52) U.S. Cl.
CPC .......... *G06F 21/6218* (2013.01); *G06F 21/31* (2013.01); *G06F 21/606* (2013.01); *G06F 21/78* (2013.01)

(58) Field of Classification Search
CPC ...... G06F 21/31; G06F 21/6218; G06F 21/78; G06F 21/606
See application file for complete search history.

(56) References Cited

U.S. PATENT DOCUMENTS 7,627,617 B2 * 12/2009 Kavuri .................. G06F 3/0649
8,489,834 B1 *  7/2013 Kumbhari ........... H04L 67/1097
                                                          711/162
(Continued)

FOREIGN PATENT DOCUMENTS

JP    2003-173284 A    6/2003
JP    2006-174350 A    6/2006
(Continued)

OTHER PUBLICATIONS

Muntaha Alawneh and Imad M. Abbadi. 2008. Preventing information leakage between collaborating organisations. In Proceedings of the 10th international conference on Electronic commerce (ICEC '08). Association for Computing Machinery, New York, NY, USA, Article 38, 1-10. (Year: 2008).*

(Continued)

*Primary Examiner* — Kari L Schmidt
(74) *Attorney, Agent, or Firm* — Crowell & Moring LLP

(57) ABSTRACT

A computer system that processes data among a plurality of sites each including a computer having a processor and a memory. The computer includes an application for performing predetermined processing on data, an execution manager for managing execution of the application, and data transfer policies specifying whether data of a processing result of the application is allowed to be transmitted to the external. The execution manager generates information on data used by the application being executed as information on data to be transmitted and applies the data transfer policies to the data in the information on data to be transmitted to determine (Continued)

whether the data to be transmitted can be transmitted to the outside of the site.

10 Claims, 15 Drawing Sheets

(51) Int. Cl.
  *G06F 21/60* (2013.01)
  *G06F 21/78* (2013.01)

(56) References Cited

U.S. PATENT DOCUMENTS

| | | | |
|---|---|---|---|
| 9,009,858 B2* | 4/2015 | Sapp, II | H04L 63/10 |
| | | | 726/4 |
| 9,398,087 B1 | 7/2016 | Hosie et al. | |
| 9,747,455 B1* | 8/2017 | Mcclintock | H04L 63/1441 |
| 10,574,698 B1* | 2/2020 | Sharifi Mehr | H04L 63/1491 |
| 10,839,098 B2* | 11/2020 | Borup | G06F 21/554 |
| 10,909,265 B2* | 2/2021 | Jones | G06F 16/9558 |
| 2003/0105979 A1* | 6/2003 | Itoh | H04L 63/105 |
| | | | 726/24 |
| 2004/0030502 A1* | 2/2004 | Martin | G06F 16/80 |
| | | | 702/19 |
| 2004/0034521 A1* | 2/2004 | Kawakura | G06F 16/3337 |
| | | | 707/E17.073 |
| 2006/0136987 A1 | 6/2006 | Okuda | |
| 2006/0271702 A1* | 11/2006 | Canali | H04Q 11/0478 |
| | | | 709/238 |
| 2009/0055891 A1* | 2/2009 | Okamoto | H04L 63/101 |
| | | | 726/1 |
| 2009/0323681 A1* | 12/2009 | Ventakaramaiah | H04L 45/308 |
| | | | 726/1 |
| 2009/0328033 A1* | 12/2009 | Kohavi | G06F 9/5027 |
| | | | 718/1 |
| 2013/0312117 A1* | 11/2013 | Sapp, II | G06F 21/62 |
| | | | 726/30 |
| 2013/0326641 A1* | 12/2013 | Minaguchi | G06F 21/62 |
| | | | 726/30 |
| 2015/0074824 A1* | 3/2015 | Toda | G06F 21/78 |
| | | | 726/28 |
| 2015/0178223 A1* | 6/2015 | Nishimura | G06F 12/1441 |
| | | | 711/163 |
| 2016/0249206 A1* | 8/2016 | Yu | H04W 4/70 |
| 2017/0013077 A1* | 1/2017 | Bevan | H04L 63/20 |
| 2017/0061153 A1 | 3/2017 | Gordon et al. | |
| 2017/0076099 A1* | 3/2017 | Yao | G06F 21/53 |
| 2017/0094010 A1* | 3/2017 | Dinan | G06F 15/17337 |
| 2017/0185551 A1* | 6/2017 | Ohba | G06F 13/372 |
| 2018/0182064 A1* | 6/2018 | Uehara | H04N 21/23611 |
| 2018/0217875 A1* | 8/2018 | Takeuchi | G06F 9/4856 |
| 2018/0247163 A1* | 8/2018 | Oda | G06F 18/217 |
| 2018/0275900 A1* | 9/2018 | Teranishi | G06F 12/14 |
| 2019/0213036 A1* | 7/2019 | Mattson | G06F 9/5072 |
| 2019/0354451 A1* | 11/2019 | Hagan | G06F 11/1448 |
| 2020/0134064 A1* | 4/2020 | Guha | G06F 16/13 |
| 2020/0159466 A1* | 5/2020 | Mosko | G06F 3/126 |
| 2020/0162543 A1* | 5/2020 | Mosko | H04L 67/1091 |
| 2021/0152602 A1* | 5/2021 | Mukund | H04L 41/342 |

FOREIGN PATENT DOCUMENTS

| | | |
|---|---|---|
| JP | 2015-118631 A | 6/2015 |
| WO | WO 2017/089943 A1 | 6/2017 |

OTHER PUBLICATIONS

F. Doelitzscher, C. Reich and A. Sulistio, "Designing Cloud Services Adhering to Government Privacy Laws," 2010 10th IEEE International Conference on Computer and Information Technology, Bradford, UK, 2010, pp. 930-935. (Year: 2010).*

International Search Report (PCT/ISA/220 & PCT/ISA/210) issued in PCT Application No. PCT/JP2020/011853 dated Jun. 16, 2020 (five (5) pages).

Japanese-language Written Opinion (PCT/ISA/237) issued in PCT Application No. PCT/JP2020/011853 dated Jun. 16, 2020 (four (4) pages).

* cited by examiner

~ 323-A

```
Policy_corporate_A load_policy("Policy_basic", force)              }- 702

[A.1 in]

[A.1 out]
replace(TAG, "gps", copy("39° 54, 116° 23"))    }- 703
replace(TAG, "data", dummy("dummy.txt", *, 1))  }- 704 alert(SIZE, "log_1", 10MB)   }- 705
custom1(...) }- 706
```

```
Policy_basic

[A.1 in]

[A.1 out]
load_parent_out_policy()  // VISUALIZE IT WITH GUI
prohibit(TAG, "name")   }- 711
prohibit(TAG, "gps")    }- 712

[A.out && B.in] // POLICY TO BE APPLIED IF CONDITIONS ARE SATISFIED IN
                            BOTH OUT AND IN.
custom2(...)
```

FIG.7B

1500 TAG SUCCESSION PROCESSING

321S APPLICATION PROGRAM (SAMPLE)

```
import tag_succession
        :
@exclude_key(["kelvin"]) ...(1501)
@exclude_tag(["t_temperature"]) ...(1502)
@add_tag(["t_environment"]) ...(1503)
@trace_tag ...(1504)
def func(data):
    if "temp" in data:
        t = data.get("temp") + 273
    elif "kelvin" in data:
        t = data.get("kelvin")
    edit_temp = {"edit_temp": t}
    return edit_temp if __name__ == '__main__':
    print('Call func.')
    data = {"temp": 0, "kelvin": 273}
    output = func(data)
```

1510 TAG INFORMATION (BEFORE EXECUTION)

[temp]
t_temperature,
t_climate

[kelvin]
t_kelvin

⇒

1511 TAG INFORMATION (AFTER EXECUTION)

[temp]
t_temperature,
t_climate

[kelvin]
t_kelvin

[edit_temp]
t_climate,
t_environment

*FIG.15*

COMPUTER SYSTEM, DATA CONTROL METHOD, AND STORAGE MEDIUM

CLAIM OF PRIORITY

The present application claims priority from Japanese patent application JP 2019-174473 filed on Sep. 25, 2019, the content of which is hereby incorporated by reference into this application.

BACKGROUND

This invention relates to a computer system that transfers data among a plurality of sites.

The growth of Internet of Things (IoT) has brought drastic increase of devices connected in a network. Processing data of those devices by collecting, analyzing, and visualizing propels contributes to acceleration of movement to increase the efficiency and accuracy of existing work or create a new business.

Application of the IoT technology expands rapidly in the industrial field; methods for globally deploying a variety of data processing are studied or implemented for device monitoring and control, product quality control, work management for workers, achievement of traceability, and process flow optimization, for example.

Meanwhile, limitations on the circulation of data have been enhanced by regional and national laws and regulations. For example, the EU General Data Protection Regulation (GDPR) and Chinese Cybersecurity Law are known.

Such limitations are to protect personal information or prevent criminalities; some regulations prohibit data transmission to the outside of the country depending on the kind of the data, in addition to protecting data. It is expected that more countries or regions will have limitations on the circulation of data; however, the kinds of data subject to the limitations are not the same among the regions and countries.

In processing data of globally spread devices through IoT by collecting, operating on, analyzing, and visualizing, it is necessary to consider the above-described limitations on the circulation of data determined by the countries and regions.

WO 2017/089943 A is known as an example where the places to process data are considered. WO 2017/089943 A discloses a technique to deploy processing nodes consisting of an application to a plurality of locations. It acquires what kinds of data are to be handled before deploying the processing nodes, determines where to deploy the processing nodes in consideration of the kinds of data allowed to be handled at each location, and processes data at the locations where the processing nodes are deployed.

SUMMARY

The aforementioned WO 2017/089943 A discloses deploying the processing nodes to the locations allowed to handle the data to be used by the application. However, to process data of globally spread devices, data has to be processed at all locations. Unlike WO 2017/089943A, a location where no processing node is deployed cannot be maintained.

Moreover, regarding the aforementioned limitations on the circulation of data, the kinds of data prohibited to be transmitted to the outside of the country (or region) are different among the locations (countries or regions) of the sites to process data. For example, Japan allows transmission of positional information determined by the Global Navigation Satellite System (GNSS) to the outside of Japan but China prohibits transmission of the same to the outside of China by Cybersecurity Law.

To develop and run an application that processes data of globally spread devices by collecting, operating on, and analyzing, it is necessary to consider the kind of data to be transmitted from a site where data is processed to the outside of the country or region in view of the laws and regulations of the country or region where the site is located.

The term "site" in the following description is defined as a unit of group, organization, country, or region that is allowed to freely share data under the same rule among a plurality of rules of the organization, the region, and the like.

For a developer of an application to interpret the laws and regulations for each site to deploy the application and determine the kind of data allowed to be transmitted from one site to the external, a large amount of effort is required, which increases the development cost of the application.

This invention is accomplished in view of the above-described issues, aiming to readily determine whether given data is allowed to be transmitted from a site to the external for an application deployed to a plurality of sites.

An aspect of this invention is a computer system that processes data among a plurality of sites each including a computer having a processor and a memory. The computer includes an application for performing predetermined processing on data, an execution manager for managing execution of the application, and data transfer policies specifying whether data of a processing result of the application is allowed to be transmitted to the external. The execution manager generates information on data used by the application being executed as information on data to be transmitted and applies the data transfer policies to the data in the information on data to be transmitted to determine whether the data to be transmitted is allowed to be transmitted to the outside of the site.

According to the above-described aspect, for an application that is deployed to a plurality of sites and transmits data among the plurality of sites, the execution manager for managing execution of the application automatically identifies data prohibited to be transmitted from a site to the external with reference to the data transfer policies before the data is transmitted. The execution manager can also replace the data prohibited to be transmitted with dummy data.

Accordingly, the application developer does not need to interpret the regulations for each site; efficient development and execution of the application are achieved.

The disclosure enables readily determining whether given data is allowed to be transmitted to the outside of a site.

The details of at least one embodiment of a subject matter disclosed herein are set forth in the accompanying drawings and the following description. Other features, aspects, and effects of the disclosed subject matter become apparent from the following disclosure, drawings, and claims.

BRIEF DESCRIPTION OF THE DRAWINGS

FIG. 7A is a diagram showing an example of a data transfer policy according to the embodiment of this invention.

FIG. 7B is a diagram showing an example of a basic data transfer policy according to the embodiment of this invention.

FIG. 15 is a diagram illustrating an example of tag succession processing performed by the application execution module according to the embodiment of this invention.

DETAILED DESCRIPTION OF THE EMBODIMENTS

Hereinafter, an embodiment of this invention is described based on the accompanying drawings.

Figure 1:
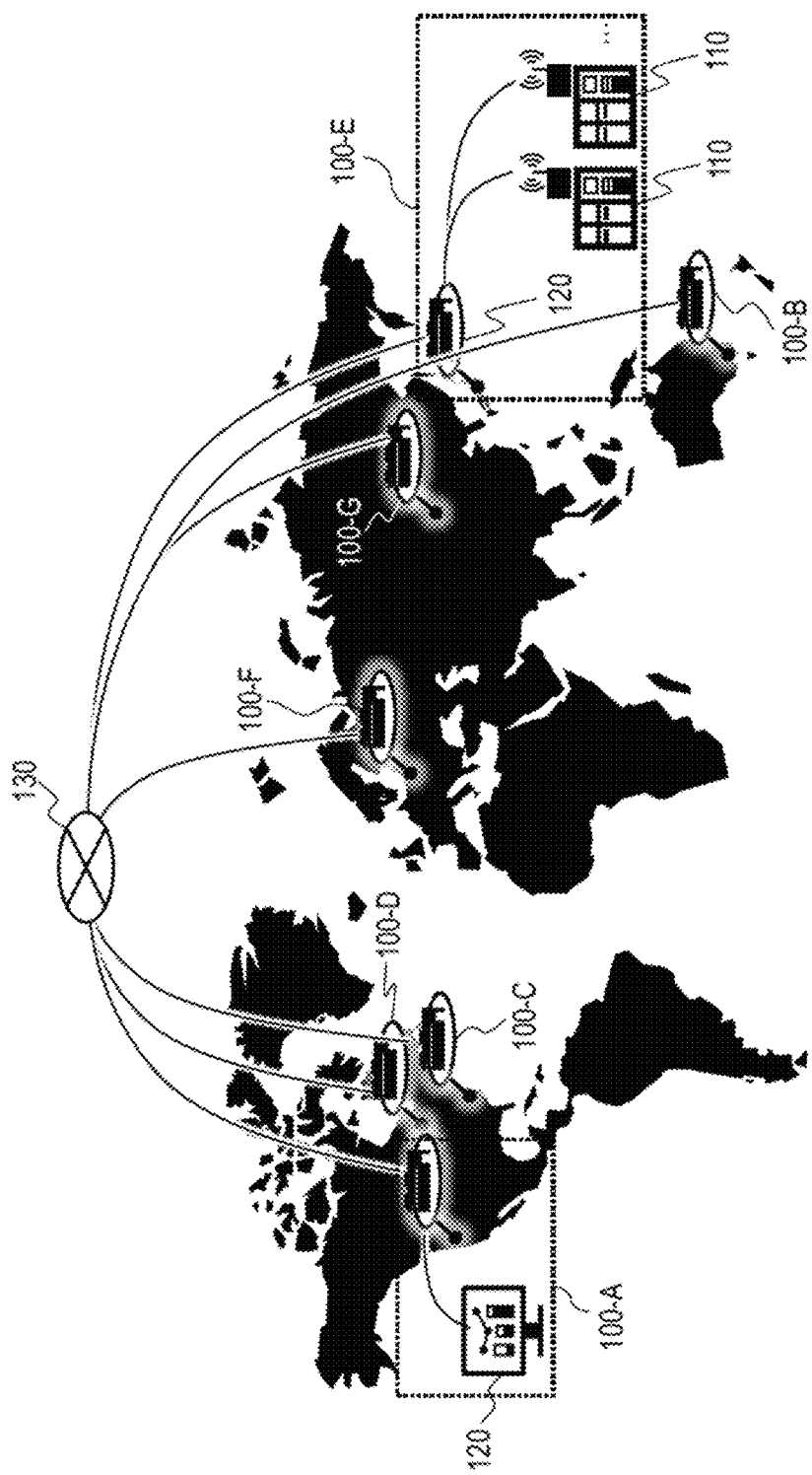
FIG. 1 is a diagram illustrating an example of sites to deploy an application according to an embodiment of this invention.

FIG. 1 is a diagram illustrating an example of sites to deploy an application. Sites 100-A to 100G are provided in different regions or countries on the earth. Each site includes an application server 120 that is interconnected with the application servers 120 in the other sites via a network 130 to work. In the following description, a reference sign 100 without a suffix beginning with "-" is used for a site, unless a specific site is referred to. The same applies to the other elements.

At each site 100, an application server 120 is connected with a plurality of edge servers 110 to acquire and process data of the devices managed by the edge servers 110. The application server 120 processes the data with an application common to the sites 100. Examples of the data processing include collecting data from the devices managed by the edge servers 110 and analyzing and visualizing the collected data.

The data processing to be performed at a site 100 can be distributed among the sites 100. For example, data of the devices in the site 100-A can be processed at the site 100-E, the processing result at the site 100-E can be transferred to the site 100-F, the transferred data can be visualized at the site 100-F, and the processing result can be transferred to the site 100-A. In another example, processing result of each site 100 can be transferred to one site 100-A and the application server 120 in the site 100-A processes the data received from each site 100.

Each site 100 includes devices that output data, one or more edge servers 110 for relaying data output from the devices, and one or more application servers 120 for acquiring data from the edge servers 110 and performing predetermined processing on the acquired data. The site 100 does not necessarily include devices that output data or edge servers 110; an application that processes data of devices stored in a database server 140 can be discussed. At least one of the plurality of sites 100 includes a development server 301.

Figure 2:
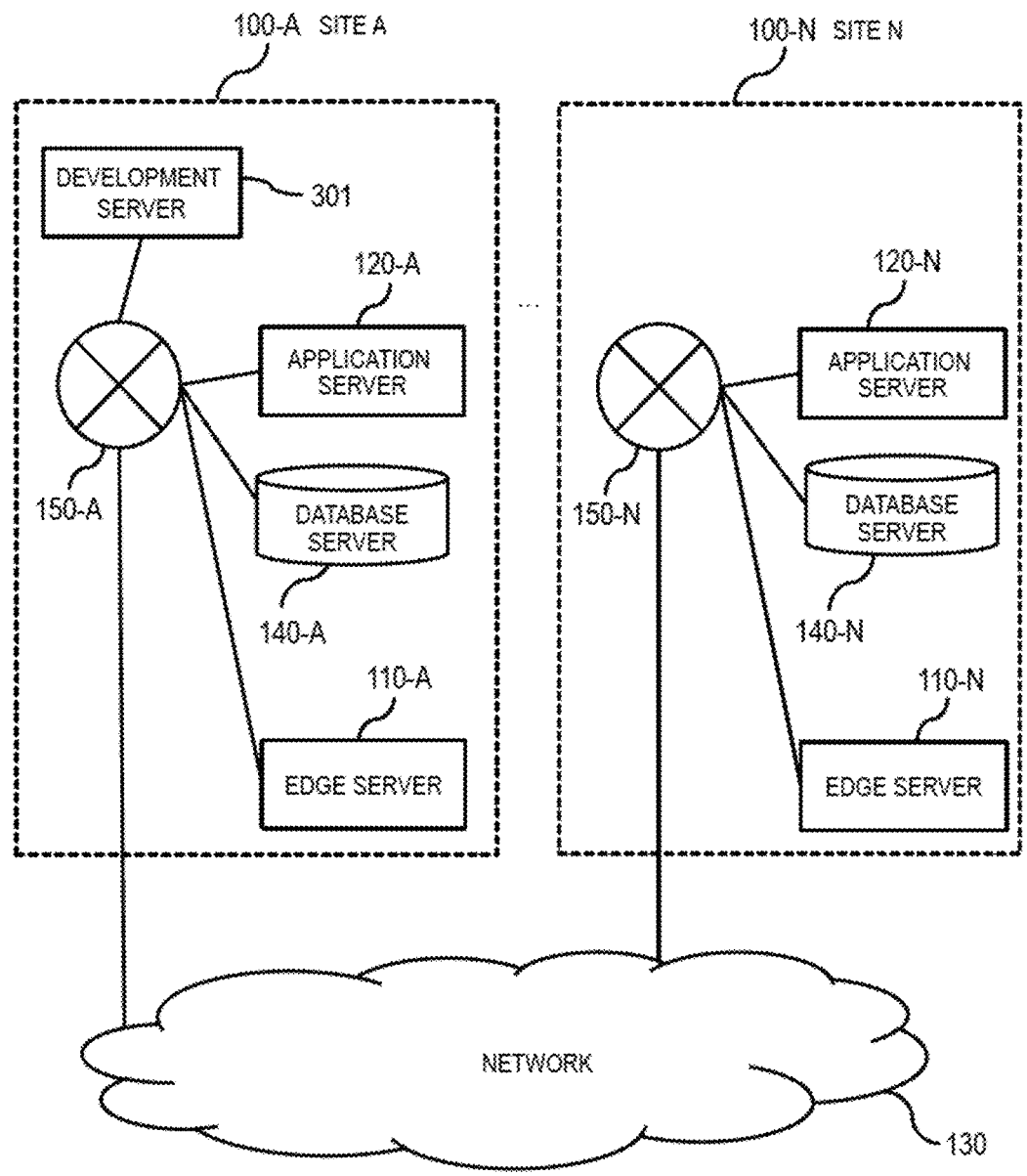
FIG. 2 is a block diagram illustrating examples of a configuration of a computer system in each site according to the embodiment of this invention.

FIG. 2 is a block diagram illustrating examples of the configuration of a computer system in each site 100 where an application is developed and operated. A site 100-A includes an application server 120-A, a development server 301, a database server 140-A, and an edge server 110-A, which are connected with another application server 120 via an internal network 150-A.

A site 100-N is the same as the site 100-A except for no development server 301; it includes an application server 120-N, a database server 140-N, and an edge server 110-N, which are connected with another application server 120 via an internal network 150-N.

The development server 301 is used to develop an application to be executed by the application server 120 and deploys the application to the sites 100. The illustrated example is an example where only the site 100-A includes a development server 301, but a plurality of sites 100 can include a development server 301.

The application server 120 executes the application deployed from the development server 301 to perform predetermined processing on the data of devices acquired from the edge server 110 and send the execution result to another application server 120.

Figure 3:
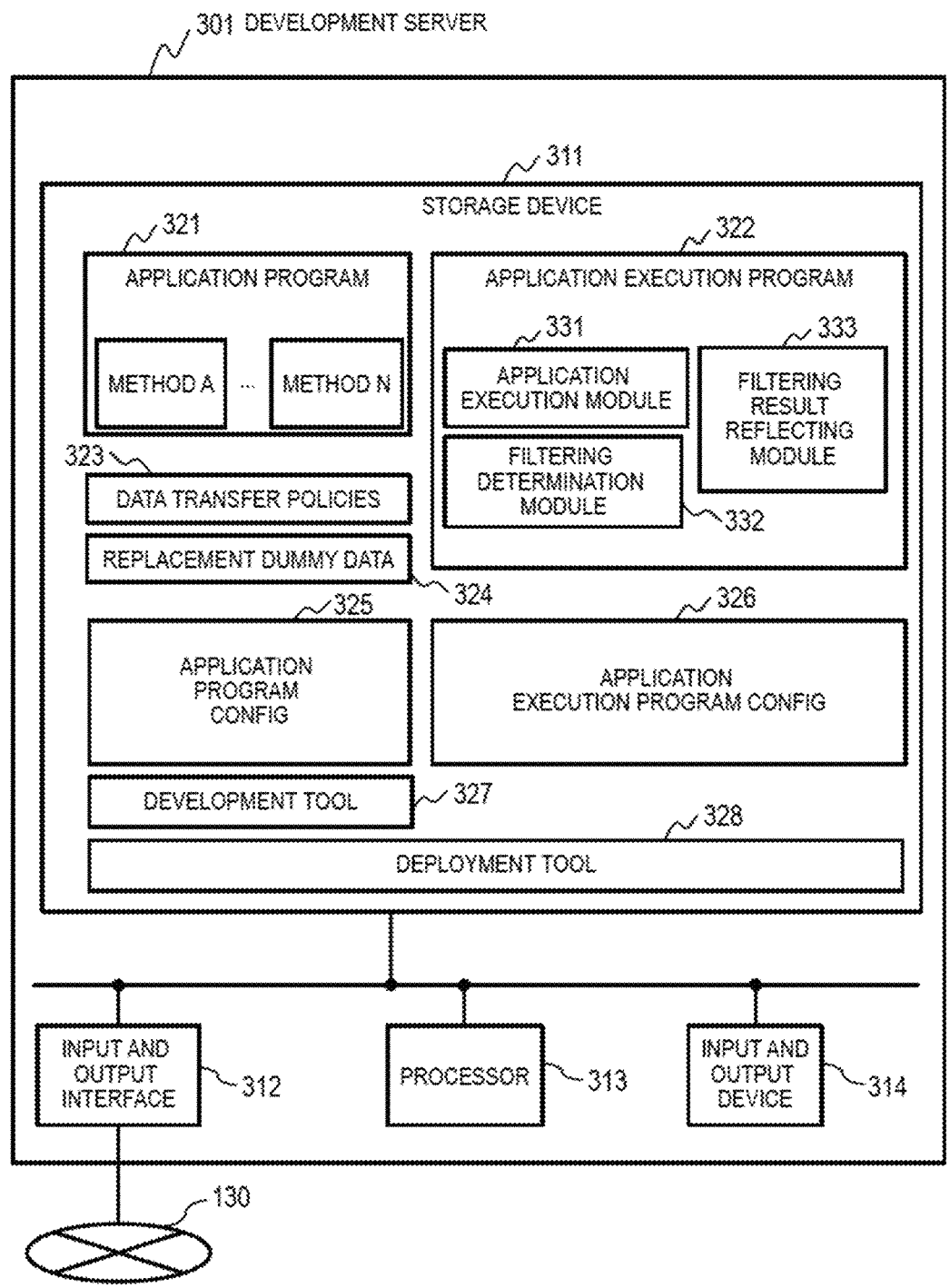
FIG. 3 is a block diagram illustrating an example of the configuration of a development server according to the embodiment of this invention.

FIG. 3 is a block diagram illustrating an example of the configuration of the development server 301. The development server 301 is a computer including a processor 313, a storage device 311, an input and output interface 312, and an input and output device 314.

The processor 313 executes a program loaded on the storage device 311. The input and output interface 312 is connected with an internal network 150 to communicate with other computers. The input and output device 314 includes a keyboard or a mouse as an input device and a display device as an output device.

The storage device 311 includes a volatile storage medium (such as a dynamic random access memory (DRAM)) and a non-volatile storage medium (such as an HDD or an SSD). The storage device 311 stores an application program 321 to be developed, an application execution program (execution manager) 322 for providing an environment to execute the application program 321 and managing the execution of the application program 321, a development tool 327 to be used to develop the application program 321, a deployment tool 328 for deploying the developed application program 321 to the sites 100, application program config 325, application execution program config 326, data transfer policies 323, and replacement dummy data 324.

The application program config 325 stores information for executing the application program 321. The application execution program config 326 stores information for executing the application execution program 322.

The data transfer policies 323 store policies to perform processing such as issuing an alert on data transmission to another country or region, prohibiting such data transmission, and replacing the data to be transmitted depending on the determination conditions such as data tags and data sizes and the sites 100 where the application program 321 operates. The replacement dummy data 324 stores replacement data described in the data transfer policies 323.

The application program 321 includes a plurality of methods (processes) A to N. As will be described later, the application program 321 performs a plurality of kinds of processing in cooperation with the application servers 120 in the other sites 100.

The application execution program 322 includes an application execution module 331, a filtering determination module 332, and a filtering result reflecting module 333 to manage execution of the application program 321.

The application execution module 331 monitors execution of the application program 321. As will be described later, the application execution module 331 traces data used by the application program 321, identifies data prohibited to be transmitted to the external specified in the data transfer policies 323, and replaces such data prohibited to be transmitted with replacement dummy data 324 to continue data processing in cooperation with an application server 120 outside the site 100.

The filtering determination module 332 determines whether an execution result of the application program 321 includes data prohibited to be transmitted to another site 100. The filtering determination module 332 retrieves the data transfer policies 323 and determines whether the data to be transmitted to another site 100 is satisfactory based on the policy reflecting the regulations applied to the site 100 where the application program 321 is running.

If the execution result includes data prohibited to be transmitted to another site 100, the filtering determination module 332 sends the determination result and a processing request to the filtering result reflecting module 333. The processing request can include a request to replace the data prohibited to be transmitted to the outside of the country with predetermined replacement dummy data 324.

The filtering result reflecting module 333 replaces data the application program 321 is going to transmit to another site 100 with replacement dummy data 324 or notifies the developer that data transmission conflicting the regulations is blocked with the development tool 327 for the application program 321, in response to the processing request from the filtering determination module 332.

The function modules of the application execution program 322, namely the application execution module 331, the filtering determination unit 332, and the filtering result reflecting module 333, are loaded to the storage device 311 as programs.

The processor 313 performs processing in accordance with the program of a function module to work as a function unit for providing a predetermined function. For example, the processor 313 performs processing in accordance with the filtering determination program to function as the filtering determination module 332. The same applies to the other programs. Furthermore, the processor 313 works as function units for providing functions of a plurality of processes executed by a program. A computer and a computer system are an apparatus and a system including those function units.

Figure 4:
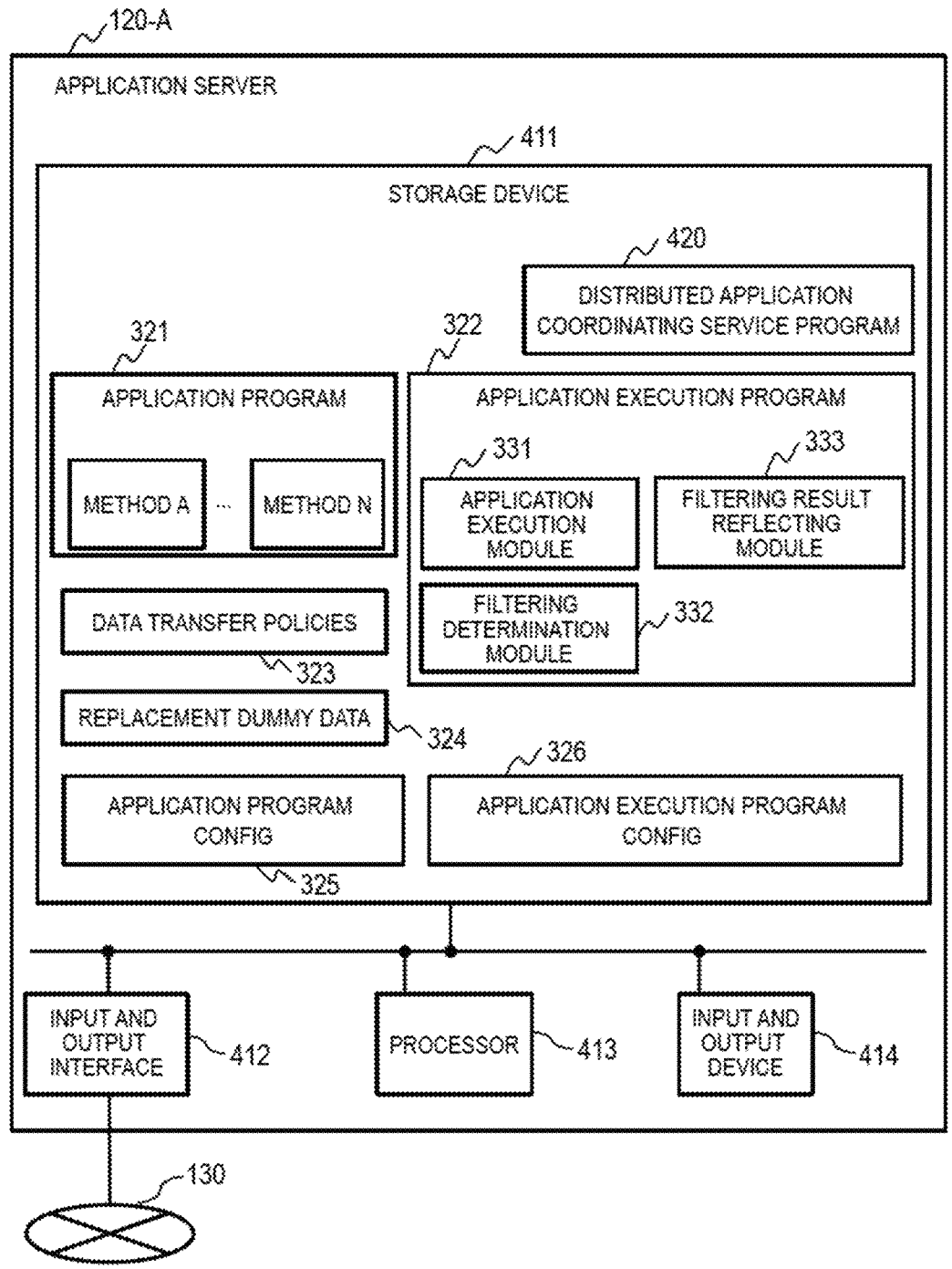
FIG. 4 is a block diagram illustrating an example of the configuration of an application server according to the embodiment of this invention.

FIG. 4 is a block diagram illustrating an example of the configuration of the application server 120-A. The application servers 120 in the other sites 100 have the same configuration and therefore, duplicate description is omitted here.

The application server 120 is a computer including a processor 413, a storage device 411, an input and output interface 412, and an input and output device 414.

The processor 413 executes a program loaded to the storage device 411. The input and output interface 412 is connected with the internal network 150 to communicate with other computers. The input and output device 414 includes a keyboard or a mouse as an input device and a display device as an output device.

The storage device 411 can be a DRAM. The storage device 411 stores a distributed application coordinating service program 420, an application program 321 deployed from the development server 301, an application execution program 322 for providing an environment to execute the application program 321, data transfer policies 323, replacement dummy data 324, application program config 325, and application execution program config 326.

The programs and data to be loaded to the storage device 411 of the application server 120 are configured same as those for the development server 301, except for the development tool 327 and the deployment tool 328. That is to say, the application program 321, the application execution program 322, the data transfer policies 323, the replacement dummy data 324 are software deployed from the development server 301.

The distributed application coordinating service program 420 to run on the application server 120 makes the plurality of methods (processes) A to N of the application program 321 run in cooperation among the sites 100. The distributed application coordinating service program 420 can include a configuration sharing function, a member acquiring function, and/or a distribution locking function.

The distributed application coordinating service program 420 is used to share the same configuration information, identify an active application server 120, and connect the application program 321 to the active application server 120 to run the application program 321 as one cluster across a plurality of sites. The application program 321 can make a cluster among the plurality of sites 100.

For example, the application server 120 in the site 100-A executes the method A included in the application program 321 and sends the result to the site 100-B. The application server 120 in the site 100-B executes the method F included in the application program 321 based on the received result of the method A and sends the result to the site 100-G. The application server 120 in the site 100-G executes the method B included in the application program 321 and distributes the result to each site 100.

As described above, the distributed application coordinating service program 420 distributes the methods A to N included in the application program 321 to the sites 100 to execute them. The distributed application coordinating service program 420 makes preselected sites 100 cooperate to run the application program 321.

The aforementioned programs and data in FIGS. 3 and 4 to be used to develop the application program 321 can be provided to the storage device 311 or 411 from an external device via a non-transitory storage medium or communication lines.

Figure 5:
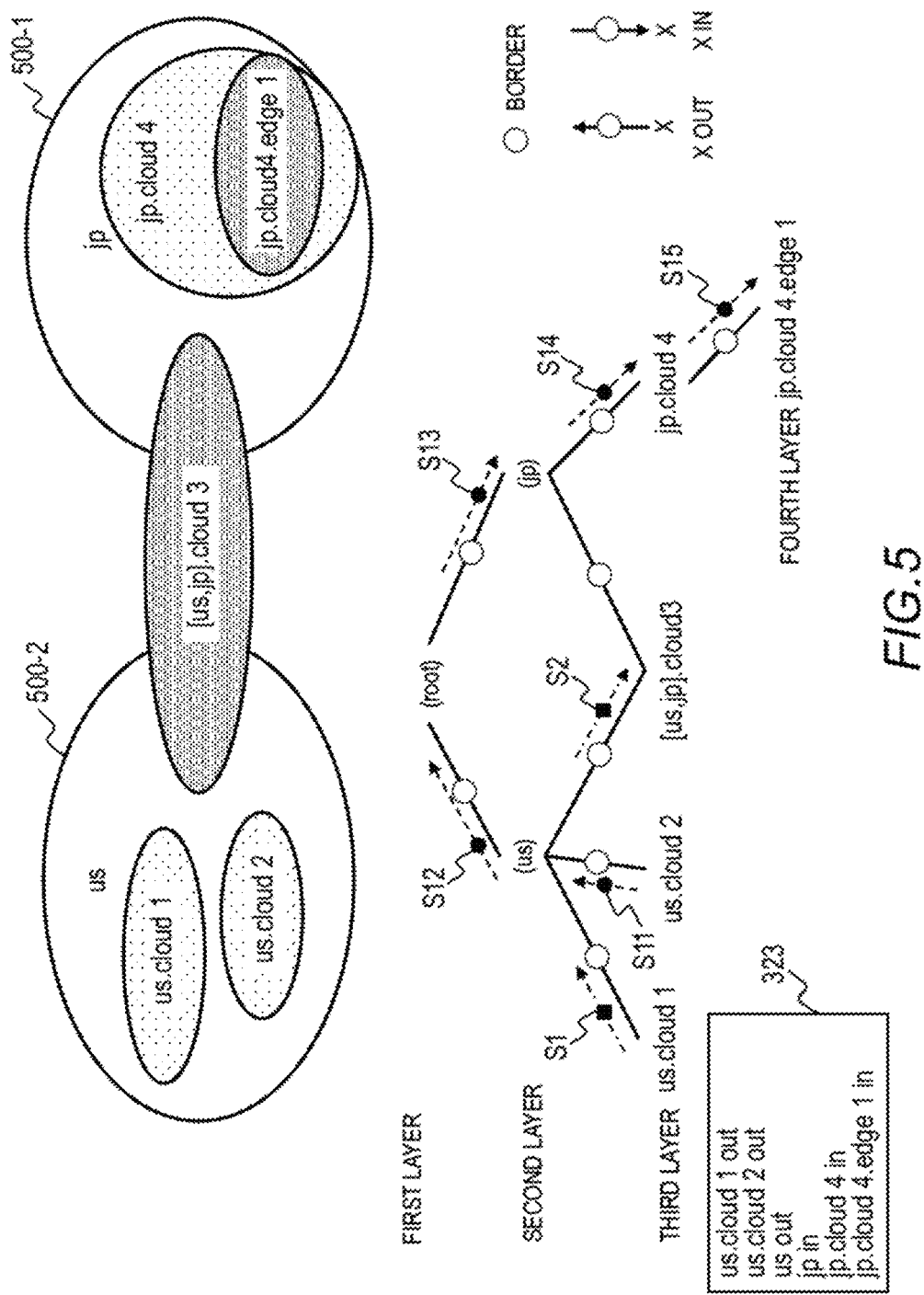
FIG. 5 is a diagram illustrating an example of the layered structure of the computer system together with the times to refer to the data transfer policies according to the embodiment of this invention.

FIG. 5 is a diagram illustrating an example of the layered structure of the computer system together with the times to refer to the data transfer policies 323. FIG. 5 illustrates relations between countries (or regions) the computer system belongs to and the borders to trigger the action of referring to the data transfer policies 323.

The domains 500-1 and 500-2 correspond to sites (for example, countries or regions) having different limitations (regulations) on the circulation of data. The layered structure of the computer system can be as illustrated in FIG. 5: the fourth layer is for edge servers 110, the third layer is for application servers 120, and the second layer is for countries or regions having different limitations on the circulation of data. Like this example, the relationship among the countries or regions to communicate data is expressed by layers.

In the domain 500-1, an edge server 110 (jp.cloud4.edge1) is connected within a computer system jp.cloud4 including an application server 120. In the domain 500-2, computer systems us.cloud1 and us.cloud2 including an application server 120 operate. Further, across the domains 500-1 and 500-2, a computer system [us,jp].cloud3 operates. As noted from the above, a border between layers of the computer system is expressed by a dot (.) and a computer system belonging to a plurality of domains A and B is expressed as [A,B].

The time for an application server 120 to refer to the data transfer policies 323 is when data is transmitted across a layer. The data transfer policies 323 include predetermined policies to check data when the data is transmitted across a layer.

For example, to send data from "us.cloud1" to "[us,jp].cloud3", the application server 120 checks the data against the data transfer policies 323 at S1 and S2 in FIG. 5. At S1, data goes out (out) from "us.cloud1" on the third layer to "us" on the second layer. At this time, the application server 120 in "us.cloud1" checks whether the data transfer policies 323 include a policy "us.cloud1 out". In this description, the transfer from the (n+1)th layer to the n-th layer is defined as "out".

If the data transfer policies 323 include a policy "us.cloud1 out" and the data to be transmitted needs to be processed (prohibited to be transmitted, replaced with dummy data, or transmitted with an alert) in accordance with the policy, a processing request to perform the processing described in the policy is sent to the filtering result reflecting module 333, as will be described.

If the data is not specified in the policy "us.cloud1 out", the data enters (in) from the second layer "us" to the third layer "[us,jp].cloud3" at S2 in FIG. 5. In this description, the transfer from the n-th layer to the (n+1)th layer is defined as "in". At this time, the application server 120 in "us.cloud1" checks whether the data transfer policies 323 include a policy "[us,jp].cloud3 in" and whether the data to be transmitted needs to be processed in accordance with the policy.

The agent to check data against the data transfer policies 323 is the computer system (application server 120 therein) that outputs the data because the data needs to be checked before the data is handed over from a site to another.

In similar, to send data from "us.cloud2" to "jp.cloud4.edge1", the data goes through a plurality of borders between layers in the order of "us.cloud2", "us", "root", "jp", "jp.cloud4", and "jp.cloud4.edge1". During the transmission, the data is checked against the data transfer policies 323 at S11 to S15 in FIG. 5.

At S11, the application server 120 in "us.cloud2" checks the data against the policy "us.cloud2 out" in the data transfer policies 323.

At S12, the application server 120 in "us.cloud2" checks the data against the policy "us out" in the data transfer policies 323.

At S13, the application server 120 in "us.cloud2" checks the data against the policy "jp in" in the data transfer policies 323.

At S14, the application server 120 in "us.cloud2" checks the data against the policy "jp.cloud4 in" in the data transfer policies 323.

At S15, the application server 120 in "jp.cloud4" checks the data against the policy "jp.cloud4.edge1 in" in the data transfer policies 323.

As described above, the computer system (the application server 120 therein) to send data determines whether to replace the data with reference to the data transfer policies 323 at the time when data passes through a border between layers by either "in" or "out".

In the foregoing examples, the events that data sent from a computer system (any of "us.cloud1" to "jp.cloud4") passes through a border between layers are determined to occur at "us.cloud2" for S12 to S14 and at "jp.cloud4" for S15. However, as far as the rule that data is checked against the data transfer policies 323 before reaching the destination is followed, when to check data is not limited to this example. For example, checking data against the data transfer policies 323 at S15 can be performed at "us.cloud2".

The domains 500 can be not only countries or regions but also ranges where the limitations on the circulation of data are different. The data transfer policies 323 can be referred to when data passes through a border where the limitations (rules) on the circulation of data change, for example a border between in-house communication and communication with the external. The outside of a site 100 can be defined as a range where the limitations on the circulation of data are different from the domain 500 including the site 100.

The domains 500 can also be aggregations of countries regarded as regions, prefectures, or states that can determine the limitations on the circulation of data with laws, codes, or state laws.

Figure 6:
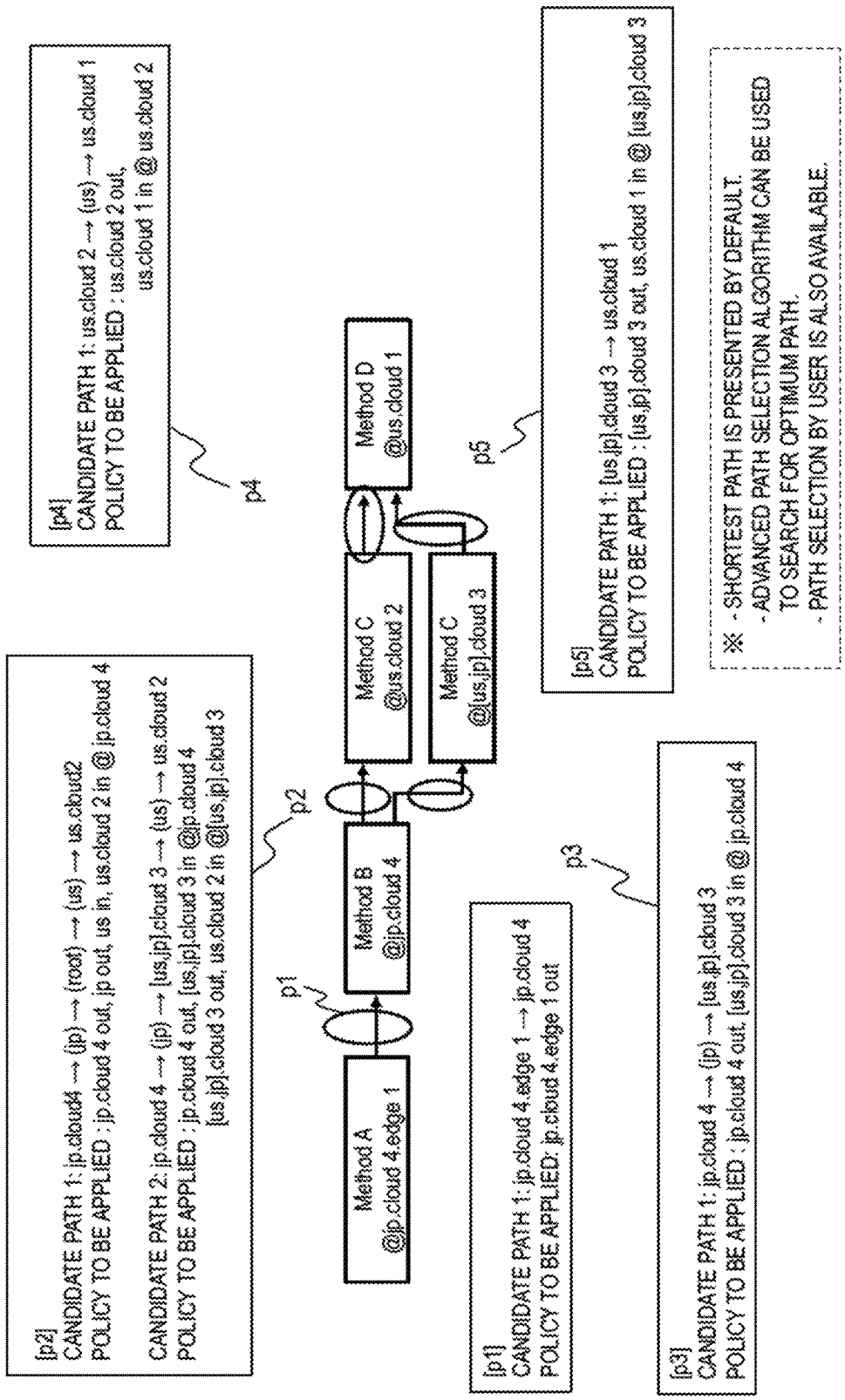
FIG. 6 is a diagram illustrating examples of communication paths and the policies to be applied according to the embodiment of this invention.

FIG. 6 is a diagram illustrating examples of communication paths and the policies to be applied. FIG. 6 illustrates relations between the paths selectable to transmit data from "jp.cloud4.edge1" to "us.cloud1" shown in FIG. 5 while processing the data and the data transfer policies 323.

First, when sending data from "jp.cloud4.edge1" on the fourth layer in FIG. 5 to "jp.cloud4" on the third layer, the computer system "jp.cloud4.edge1" checks the data against the policy "jp.cloud4.edge1 out" in the data transfer policies 323 at p1 in FIG. 6.

Next, when sending data from "jp.cloud4" to "us.cloud2" via the second layer and the first layer in FIG. 5, the computer system "jp.cloud4" checks the data against the policies "jp.cloud4 out", "jp out", "us in", and "us.cloud2 in" in the data transfer policies 323 at p2 in FIG. 6.

To transfer data from "jp.cloud4" to "us.cloud2", another path via "jp", "[us,jp].cloud3", and "us" that does not pass through the first layer "root" is also available.

In this case, the computer system "jp.cloud4" checks data against the policies "jp.cloud4 out", "jp out", and "[us,jp].cloud3 in" in the data transfer policies 323 at p2 in FIG. 6 when sending the data to "us.cloud2" and the computer system "[us,jp].cloud3" checks the data against the policies "[us,jp].cloud3 out" and "us.cloud2 in".

Further, the computer system "jp.cloud4" checks data against the policies "jp.cloud4 out" and "[us,jp].cloud3 in" in the data transfer policies 323 at p3 in FIG. 6 when sending the data to "[us,jp].cloud3" via the second layer "jp" in FIG. 5.

Next, the computer system "us.cloud2" checks data against the policies "us.cloud2 out" and "us.cloud1 in" in the data transfer policies 323 at p4 in FIG. 6 when sending the data to "us.cloud1" via the second layer "us" in FIG. 5.

In the meanwhile, the computer system "[us,jp].cloud3" checks data against the policies "[us,jp].cloud3 out" and "us.cloud1 in" in the data transfer policies 323 at p5 in FIG. 6, when sending the data to "us.cloud1" via the second layer "us" in FIG. 5.

FIG. 7A is a diagram showing an example of a data transfer policy 323-A. FIG. 7B is a diagram showing an example of a basic data transfer policy 323-B to be incorporated into the data transfer policy 323-A.

The data transfer policy 323-A includes a command to load the data transfer policy 323-B in FIG. 7B on the line 702.

The line 703 of the data transfer policy 323-A is written to replace data to be transmitted from the site 100 to the external with predetermined dummy data "39° 54, 116° 23", if the data is tagged as "gps" (positional information).

The line 704 of the data transfer policy 323-A is written to replace data to be transmitted from the site 100 to the external with "dummy.txt" prepared for the replacement dummy data 324, if the data is tagged as "data".

The line 705 of the data transfer policy 323-A is written to issue an alert, if the size of the "log 1" is 10 MB or more.

Further, a data transfer policy can include a function unique to the user (for example, an algorithm to review the data to determine the characteristics of the data) as shown in the line 706.

In FIG. 7B, the line 711 of the data transfer policy 323-B is written to prohibit transmission of data tagged as "name". The line 712 of the data transfer policy 323-B is written to prohibit transmission of data tagged as "gps".

As understood from the above, the data transfer policy 323-A or 323-B can specify data prohibited to be transmitted to the outside of the site 100 or data to be transmitted after being replaced by dummy data. The above described is an example where the data transfer policy 323-B is loaded and incorporated into the data transfer policy 323-A but an independent data transfer policy 323-A that does not load the data transfer policy 323-B can be prepared.

The data transfer policy 323-B can be a default data transfer policy 323 prepared at the site 100 including the development server 301 and the data transfer policy 323-A can be a policy prepared by a user in another site 100.

The above-described FIGS. 7A and 7B provide examples to replace data with a specific tag with replacement dummy data 324 when the data is going to be transmitted from an application server 120 to the external, but the policies are not limited to these examples. For example, a policy can be written to allow transmission of data with a specific tag if the destination address is a predetermined address (an address within the same domain 500 in FIG. 5, for example) but to replace the data with replacement dummy data 324 if the destination address is an address other than the predetermined address.

The data transfer policies 323 in this embodiment are specified depending on the path information (transmission path information) to the destination of the processing result of the application program 321. The filtering determination module 332 of the application execution program 322 retrieves a data transfer policy 323 associated with the destination of the processing result to determine whether the data is allowed to be transmitted based on the tag (label) of the data.

Determining data transfer policies 323 for individual domain names or addresses to be a destination enables the filtering determination module 332 of the application execution program 322 to determine whether the data is allowed to be transmitted depending on the destination, no matter where the application program 321 is deployed.

The data transfer policies 323 for individual destinations can be determined differently for individual application servers 120 where the application program 321 is deployed.

Each site 100 is provided with data transfer policies 323 for individual countries or regions to be a destination. Designating where to forward data in requesting data processing to the application program 321 enables the filtering determination module 332 to retrieve the data transfer policy 323 for the destination of the processing result and determine whether the data is allowed to be transmitted.

For a destination of data within the same site 100, country, or region, preparing a data transmission policy 323 that does not have any limitation on the data to be transmitted enables the application server 120 to send any processing result of the application program 321.

Destinations can be defined in the distributed application coordinating service program 420 that coordinates the cooperation with the other sites 100; a destination can be specified with the domain name or the address of a site 100 to cooperate.

Controlling data depending on the tag is not limited to prohibiting transmission of the data, replacing the data with dummy data, or notifying the developer; a data transfer policy 323 can specify any predefined processing.

Figure 8:
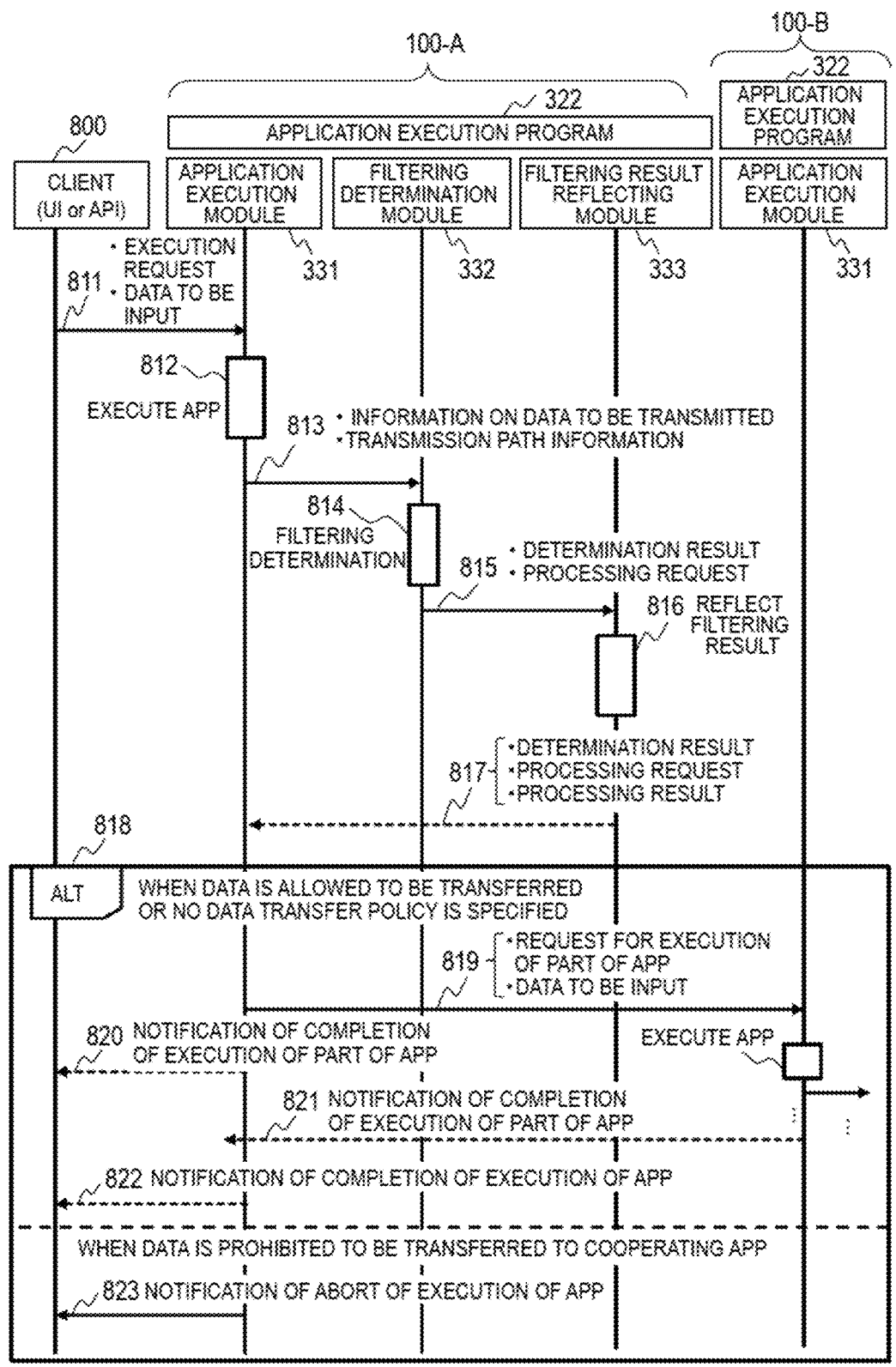
FIG. 8 is a sequence diagram illustrating an example of processing performed in the computer system according to the embodiment of this invention.

FIG. 8 is a sequence diagram illustrating an example of processing performed in the computer system. FIG. 8 illustrates an example where data processed by an application server 120 in the site 100-A is processed at the site 100-B located outside the domain 500.

A client 800, which is omitted in FIGS. 1 and 2, is a computer using the application server 120 in the site 100-A; it can be located within the site 100-A or outside the site 100-A.

The client 800 instructs the application server 120 of the site 100-A to start processing with designation of data to be processed (Step 811). The data to be processed at the site 100-A is data acquired from an edge server 110 and the data to be processed at the site 100-B is data received from the site 100-A. The instruction to start processing includes information on the address of the application server 120 to cooperate in the processing and the transmission path.

The application execution module 331 of the application execution program 322 requests the application program 321 to process data with designation of the data to be processed (Step 812).

Upon receipt of a processing result from the application program 321, the application execution module 331 sends information on the processing result (information on the data to be transmitted) and the transmission path for the processing result (information on the path to transmit the data) to the filtering determination module 332 (Step 813). The information on the data to be transmitted is generated as tag information by the application execution module 331, as will be described later.

The filtering determination module 332 determines whether the tag of the data included in the processing result is for data prohibited to be transmitted (or to be replaced with dummy data) with reference to the data transfer policies 323 (Step 814).

The filtering determination module 332 sends the determination result and a processing request based on the determination result to the filtering result reflecting module 333 (Step 815). The processing to be requested is processing specified in the data transfer policies 323, such as allowing the data transmission, replacing the data with dummy data, or prohibiting the data transmission, depending on the determination result.

The filtering result reflecting module 333 performs processing based on the determination result and the processing request received from the filtering determination module 332 (Step 816). The filtering result reflecting module 333 sends the determination result and the processing request from the filtering determination module 332 and the processing result of the requested processing to the application execution module 331 (Step 817).

The application execution module 331 alters the processing to be performed depending on the determination result in accordance with the data transfer policies 323 (Step 818). If transmission of the data to the site 100-B is allowed, the application execution module 331 proceeds to Step 819; if prohibited, the application execution module 331 proceeds to Step 823.

At Step 819, the application execution module 331 sends the processing result of the application program 321 to the site 100-B and requests the application server 120 there to process the data. Next, the application execution module 331 notifies the client 800 of completion of processing at the site 100-A (Step 820).

Upon receipt of a notification of completion of processing from the site 100-B (Step 821), the application execution module 331 notifies the client 800 of completion of all processing (Step 822).

In the case where the data prohibited to be transmitted is replaced in accordance with the data transfer policies 323, the application execution module 331 processes the data in the same way as Step 819 and notifies the client 800 that the data prohibited to be transmitted to the external is replaced at Step 820. As a result, the developer of the application program 321 using the client 800 can be informed that the processing result of the application program 321 is automatically replaced by the replacement dummy data 324 in accordance with the limitations of the domain 500 the site 100-A belongs to.

In the case where the determination at Step 818 based on the data transfer policies 323 is that the data transmission to the site 100-B is prohibited, the application execution module 331 notifies the client 800 that the processing is aborted and terminates the processing (Step 823).

Through the above-described processing, the application server 120 in the site 100-A can pursue the processing in cooperation with the application server 120 in an external site 100-B by determining whether the data of the processing result of the application program 321 is allowed to be transmitted to the site 100-B with the application execution module 331 and replacing data not allowed to be transmitted.

Figure 9:
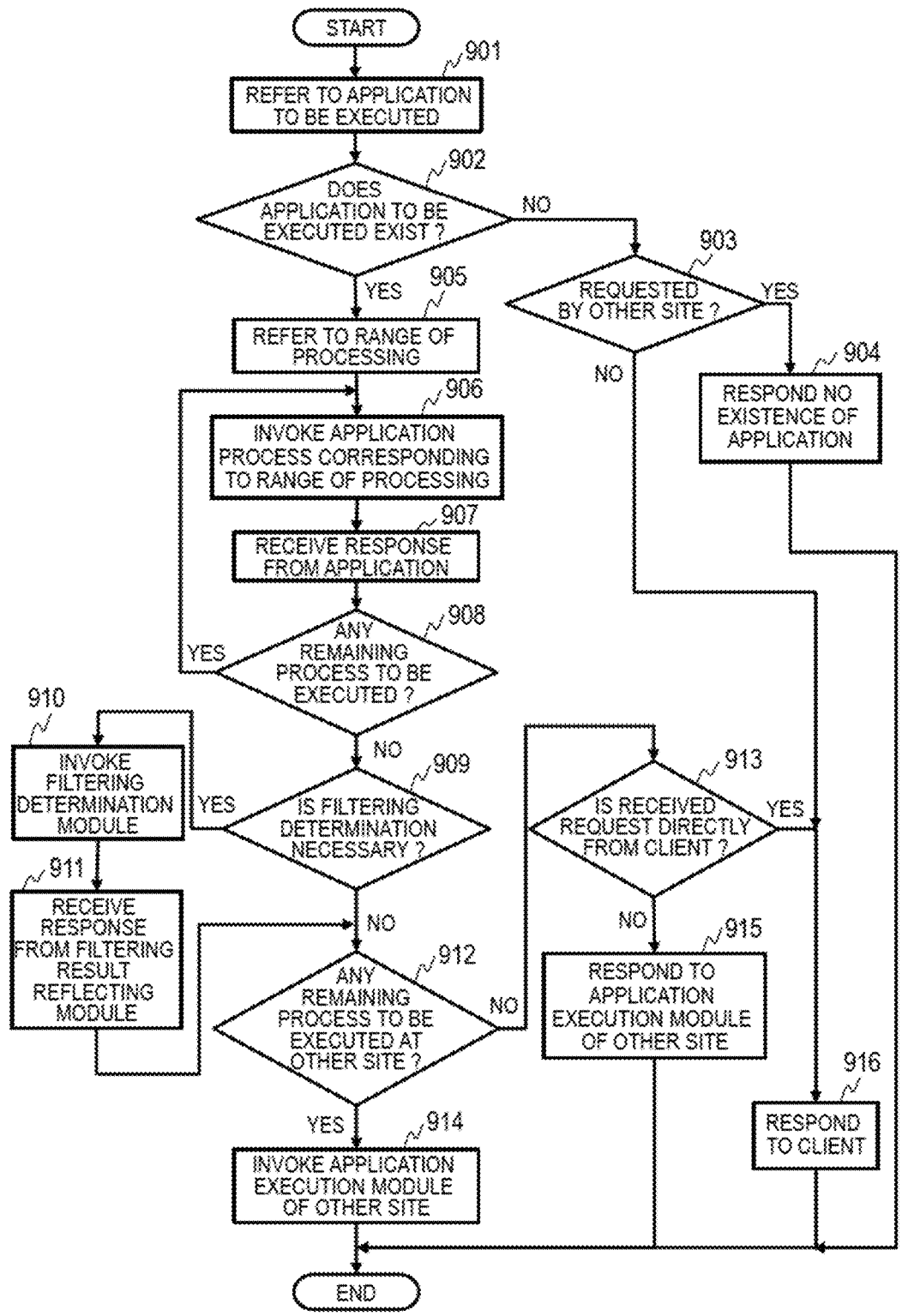
FIG. 9 is a flowchart of an example of the processing of the application execution module according to the embodiment of this invention.

FIG. 9 is a flowchart of an example of the processing of the application execution module 331. This processing is performed in response to a processing request from the client 800 shown in FIG. 8 or a processing request from another site 100.

Upon receipt of a processing request, the application execution module 331 refers to the application (the methods A to N in FIG. 3) included in the processing request (Step 901). The application execution module 331 determines whether the designated application exists (Step 902). If the designated application exists, the application execution module 331 proceeds to Step 905 and if not, the application execution module 331 proceeds to Step 903.

At Step 905, the application execution module 331 refers to the range (one or more of the methods A to N) of the application to be executed included in the processing request (Step 905) and invokes the application in the range to be executed from the application program 321 (Step 906). As described with reference to FIG. 8, the data to be processed is designated in the processing request.

Upon receipt of a notification of completion of processing from the application program 321 (Step 907), the application execution module 331 determines whether any application to be executed next exists (Step 908). If some application to be executed exists, the application execution module 331 returns to Step 906 and repeats the above-described processing; otherwise, the application execution module 331 proceeds to Step 909.

At Step 909, the application execution module 331 determines whether to enable the filtering determination module 332 with reference to the data transfer policies 323. If the data transfer policies 323 include policies for the processing result of the application program 321, the application execution module 331 proceeds to Step 910 and if not, proceeds to Step 912.

At Step 910, the filtering determination module 332 receives the processing result of the application program 321 and information on the transmission path from the application execution module 331 and determines whether the tag of the data included in the processing result is for the data prohibited to be transmitted (or to be replaced with dummy data) with reference to the data transfer policy 323. The filtering determination module 332 sends the determination result and a processing request based on the determination result to the filtering result reflecting module 333.

The filtering result reflecting module 333 performs the requested processing based on the determination result received from the filtering determination module 332 (Step 911). The filtering result reflecting module 333 sends the determination result and the processing request received from the filtering determination unit 332 and the result of the requested processing to the application execution module 331.

At Step 912, the application execution module 331 determines whether any process to be executed at another site 100 remains (Step 912). If some process remains, the application execution module 331 sends a processing request and data to the other site 100 and terminates the processing (Step 913).

If no process remains, the application execution module 331 proceeds to Step 913 and determines whether the processed processing request is received directly from the client 800.

If the processing request is received directly from the client 800, the application execution module 331 proceeds to Step 916, sends a notification of completion of processing to the client 800, and terminates the processing. If the processing request is received from another site 100, the application execution module 331 proceeds to Step 915, sends a notification of completion of processing to the other site 100, and terminates the processing.

At the aforementioned Step 902, if the application to be executed does not exist, the application execution module 331 determines whether the processing request is from another site 100 at Step 903. If the request is from another site 100, the application execution module 331 proceeds to Step 904, sends a response indicating non-existence of the application to the other site 100, and terminates the processing.

If the request is not from another site 100, the application execution module 331 proceeds to Step 916, sends a response indicating non-existence of the application to the client 800, and terminates the processing.

Figure 10:
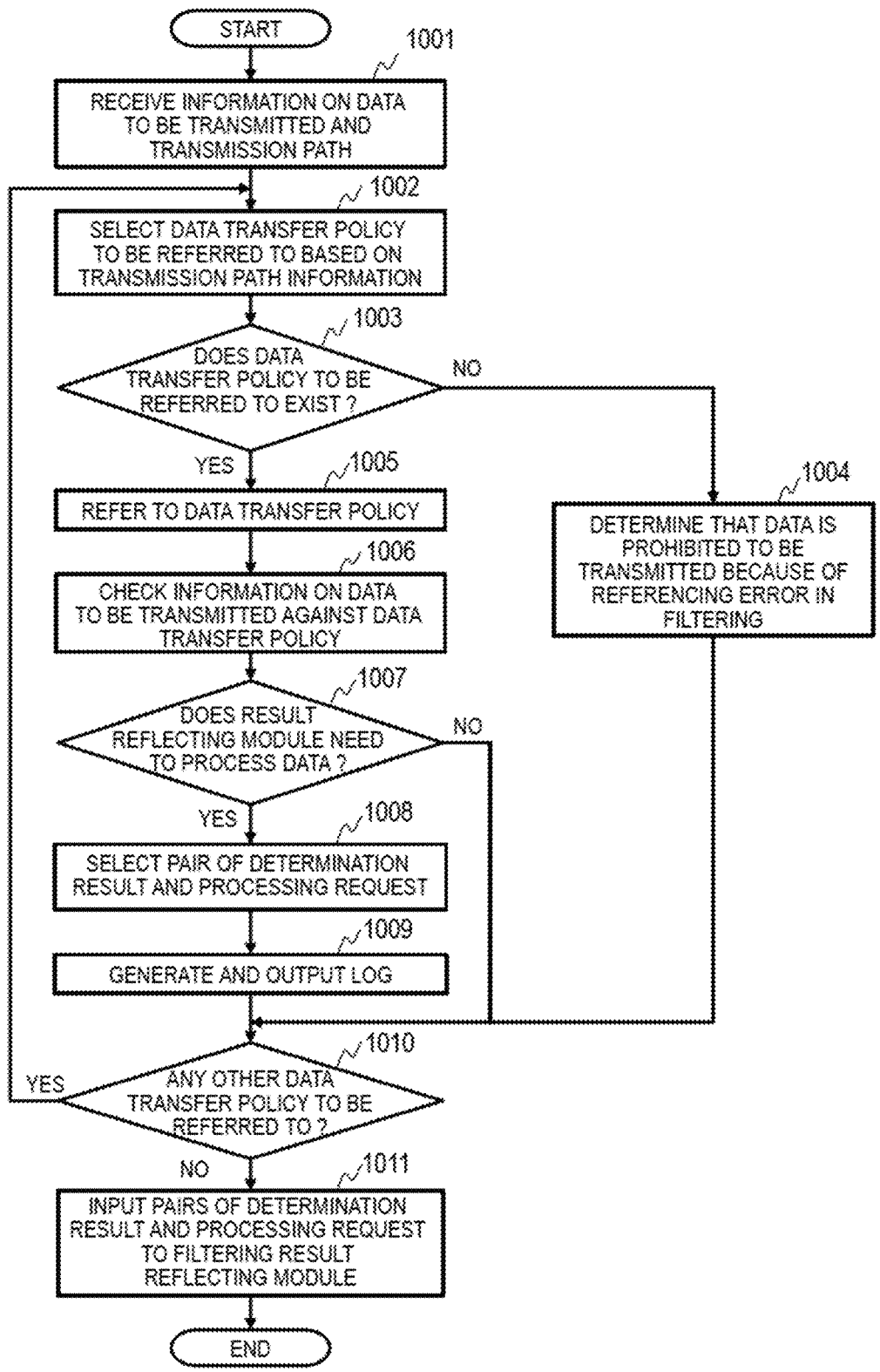
FIG. 10 is a flowchart of an example of the processing of the filtering determination module according to the embodiment of this invention.

FIG. 10 is a flowchart of an example of the processing of the filtering determination module 332. This processing is performed at Step 814 in FIG. 8.

The filtering determination module 332 acquires information on the data to be transmitted and the path to transmit the data from the application execution module 331 (Step 1001). The filtering determination module 332 selects a data transfer policy 323 to be referred to, based on the path information (Step 1002).

Next, the filtering determination module 332 determines whether the data transfer policy 323 to be referred to that is associated with the path information (the destination of data) exists (Step 1003). If the data transfer policy 323 to be referred to exists, the filtering determination module 332 proceeds to Step 1005 and if the data transfer policy 323 to be referred to does not exist, the filtering determination module 332 proceeds to Step 1004.

At Step 1004, the filtering determination module 332 determines that the data is prohibited to be transmitted and proceeds to Step 1010 because the data transfer policy 323 for transmitting the data is unknown.

At Step 1005, the filtering determination module 332 refers to the data transfer policy 323 selected at the foregoing Step 1002. The filtering determination module 332 checks information on the data to be transmitted against the data transfer policy 323 to determine whether the filtering result reflecting module 333 needs to process a processing request (Step 1007).

If a processing request needs to be processed, the filtering determination module 332 proceeds to Step 1008 and if not, proceeds to Step 1010.

At Step 1008, the filtering determination module 332 generates a determination result on the information on the data to be transmitted based on the data transfer policy 323 and a processing request to address the determination result and selects them as a pair of a determination result and a processing request.

The filtering determination module 332 generates and outputs a log including the processing request and the determination result (Step 1009). The filtering determination module 332 determines whether any other data transfer policy 323 to be referred to exists (Step 1010).

If some other data transfer policy 323 to be referred to exists, the filtering determination module 332 returns to Step 1002 and repeats the above-described processing. If no other data transfer policy 323 to be referred to exists, the filtering determination module 332 proceeds to Step 1011, outputs the pairs of a determination result and a processing request selected at Step 1008 to the filtering result reflecting module 333 to make the filtering result reflecting module 333 process the processing requests.

Through the above-described processing, the filtering determination module 332 applies data transfer policies 323 appropriate for the destination to the information on the data to be transmitted and outputs processing requests to replace data having predetermined tags with dummy data to the filtering result reflecting module 333.

Figure 11:
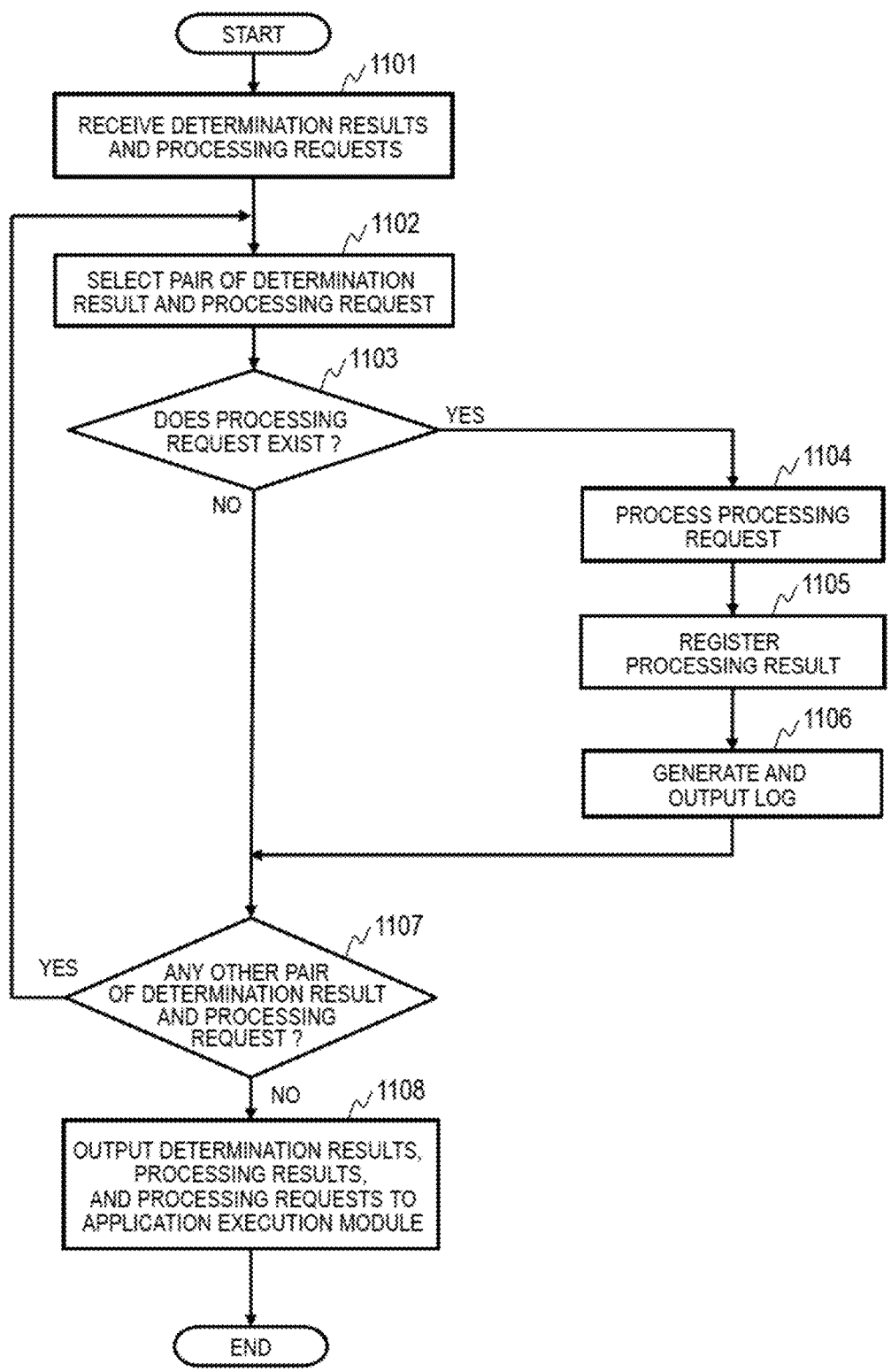
FIG. 11 is a flowchart of an example of the processing of the filtering result reflecting module according to the embodiment of this invention.

FIG. 11 is a flowchart of an example of the processing of the filtering result reflecting module 333. This processing is performed at Step 816 in FIG. 8.

The filtering result reflecting module 333 receives determination results and processing requests from the filtering determination module 332 (Step 1101). The filtering result reflecting module 333 selects one pair from the determination results and processing requests received from the filtering determination module 332 (Step 1102).

The filtering result reflecting module 333 determines whether the processing request designates specific processing with reference to the selected pair of a determination result and a processing request (Step 1103). If the processing request does not designate specific processing (the processing request includes only the determination result), the filtering result reflecting module 333 proceeds to Step 1107; if specific processing is designated in the processing request, the filtering result reflecting module 333 proceeds to Step 1104.

At Step 1104, the filtering result reflecting module 333 processes the processing request; at Step 1105, the filtering result reflecting module 333 registers the processing result to the predetermined region of the storage device 311. For example, in the case of a processing request to replace data with dummy data, the filtering result reflecting module 333 acquires the path to the replacement dummy data 324 described in the data transfer policy 323, acquires the dummy data from the specified path, and replaces the data of the processing result of the application program 321 with the dummy data. The filtering result reflecting module 333 further generates a log about the processing the processing request and outputs the log (Step 1106).

At the next Step 1107, the filtering result reflecting module 333 determines whether any unprocessed pair of a determination result and a processing request exists and if some unprocessed pair exists, the filtering result reflecting module 333 returns to Step 1102 and repeats the above-described processing. If no unprocessed pair exists, the filtering result reflecting module 333 proceeds to Step 1108 and outputs the aforementioned registered processing result and the determination result and processing request received from the filtering determination module 332 to the application execution module 331.

Through the above-described processing, in the case where the processing request is for replacing the data with dummy data, the data of the processing result of the application program 321 is replaced with specified dummy data.

Figure 12:
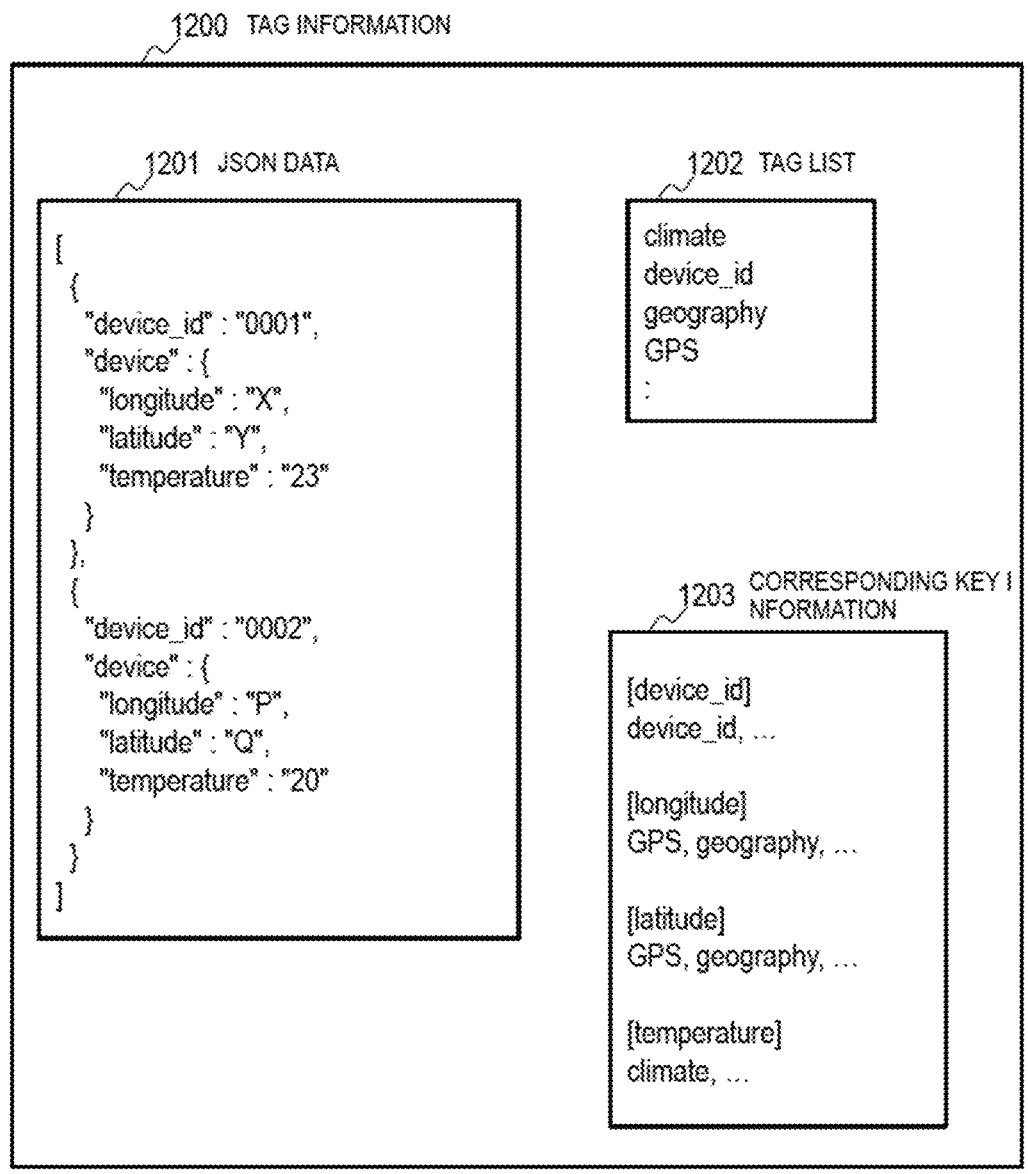
FIG. 12 is a diagram illustrating an example of tag information according to the embodiment of this invention.

FIG. 12 is a diagram illustrating an example of tag information 1200. The tag information 1200 in this embodiment is generated by the application execution module 331 that receives a processing result of the application program 321. The tag information 1200 can be generated by the application program 321.

The tag information 1200 includes JavaScript Object Notation (JSON) data 1201, a tag list 1202, and corresponding key information 1203. This embodiment provides an example where a processing result is expressed in JSON but the data format is not limited to this.

The JSON data 1201 includes a device ID, positional information (a longitude and a latitude), and a temperature, for example. The tag list 1202 stores a list of tags included in the JSON data 1201. The key corresponding key information 1203 stores tag information corresponding to keys in the JSON data 1201.

Figure 13:
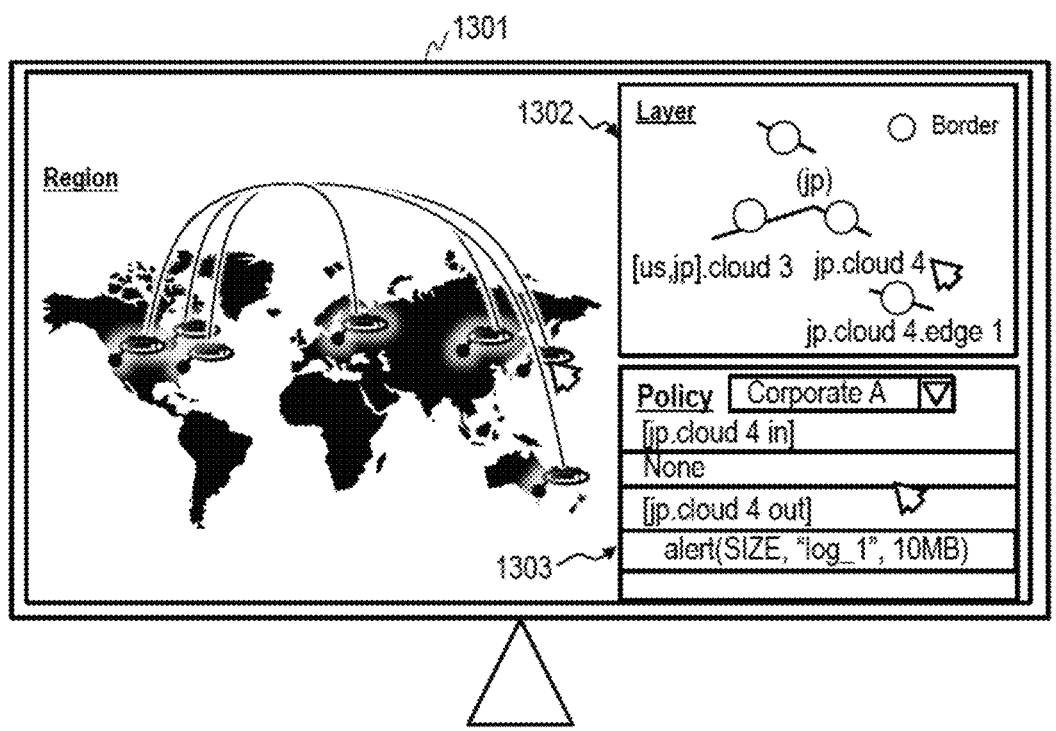
FIG. 13 is a diagram illustrating an example of an editor screen according to the embodiment of this invention.

FIG. 13 is a diagram illustrating an example of an editor screen 1301 for a data transfer policy 323. The editor screen 1301 for a data transfer policy 323 is output by the development tool 327 of the development server 301 to the input and output device 314.

The editor screen 1301 shows the layer structure of the computer system and the borders representing the times to refer to a data transfer policy 323 as illustrated in FIG. 5; it includes a region 1302 for the user to select a border or a computer system and a region 1303 to select and edit a data transfer policy 323.

This embodiment provides an example where the editor screen 1301 is output by the development server 301 but the configuration is not limited to this example; the editor screen 1301 can be output by the application execution program 322 in the application server 120.

Figure 14:
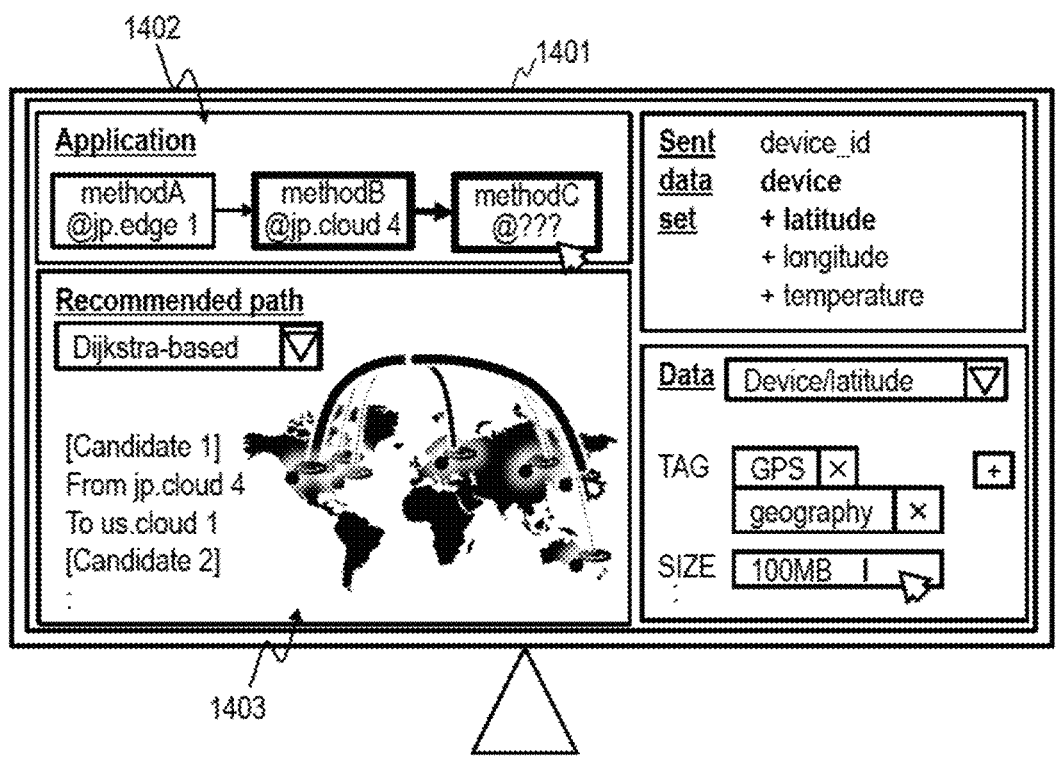
FIG. 14 is a diagram illustrating an example of a data destination selection screen according to the embodiment of this invention.

FIG. 14 is a diagram illustrating an example of a data destination selection screen 1401. The data destination selection screen 1401 is output by the developer tool 327 of the development server 301 to the input and output device 314.

The selection screen 1401 includes a region 1402 for showing the state of cooperation among the application servers 120 in the sites 100 in executing the methods A to N and a region 1403 for displaying visualized path information for an application server 120 to transmit data of a processing result from a site 100 to another site 100.

The user of the client 800 operates the selection screen 1401 to select the optimum data transmission path between the sites 100 from a plurality of candidates and registers the selected path as path information. The development tool 327 distributes the registered path information to the distributed application coordinating service programs 420 in the application servers 120, so that the optimum path is used to transmit data for the sites 100 to cooperate in executing assigned methods A to N.

This embodiment provides an example where the development server 301 outputs the selection screen 1401 but the configuration is not limited to this example; the selection screen 1401 can be output by the application execution program 322 in the application server 120.

FIG. 15 is a diagram illustrating an example of tag succession processing 1500 performed by the application execution module 331. When executing the application program 321 at Step 812 in FIG. 8, the application execution module 331 performs this processing to inherit tags representing the kinds of data. The tag succession processing enables the application execution module 331 to trace how data is input and output among the processes (methods A to N) constituting the application program 321.

The application program 321S shows a sample code and it is created by an application program developer.

The application program 321S includes decorators (annotations) as shown in the application program 321S for the application execution module 331 to perform processing to trace the tag information, after being written to import a library prepared in advance. FIG. 15 provides an example in Python but the programming language is not limited to this.

In executing the application program 321S, the application execution module 331 concurrently performs processing to make the output data of a function inherit the tag information of the input data of the function.

The tag information inherited at the application execution module 331 is used by the filtering determination module 332 to filter the data associated with tags.

The line 1501 of the application program 321S designates a tag to be excluded in transmitting data with a key. According to the example in FIG. 15, if a data key includes a key "kelvin", the tag "t_kelvin" tied with "kelvin" is not set.

The line 1502 of the application program 321S directly designates a tag to be excluded in transmitting data. According to the example in FIG. 15, if a tag "t_temperature" is included, the tag "t_temperature" is not set.

The line 1503 of the application program 321S directly designates a tag to be added. According to the example in FIG. 15, a tag "t_environment" is set.

On the premises of the information on the lines 1501 to 1503, the application execution module 331 acquires all tags in the dictionary data input as an argument for a function (func) and set them to the output data. The function "func" uses the dictionary data "data" as an input. The output data key "edit_temp" of this function basically inherits the tags of the keys "temp" and "kelvin" of the input data.

However, exclusion of the tag of the key "kelvin", exclusion of the tag "t_temperature", and addition of the tag "t_environment" are performed in accordance with the lines 1501, 1502, and 1503, respectively.

The tag succession processing 1500 is not limited to the example as shown in FIG. 15. Although this embodiment describes an example using data tags, this tag information succession processing 1500 is applicable to succession of other meta information (such as time stamp information at data write).

As described above, when executing the application program 321 at Step 812 in FIG. 8, the application execution module 331 performs succession of tags of the data used by the application program 321 to generate tag information (information on the data to be transmitted) 1511 by tracing what kind of data is input to and output from the application program 321 (the execution state of the application).

The application execution module 331 outputs the tags (labels) in the tag information 1511 as information on the data to be transmitted to the filtering determination module 332 and requests the filtering determination module 332 to determine whether the data is allowed to be transmitted to the outside of the site 100.

As described above, in transmitting or transferring data from a site 100 to another, the computer system in this embodiment can automatically replace data prohibited to be transmitted to the outside of the domain 500 the site 100 belongs to with replacement dummy data 324 by preparing a data transfer policy 323 conforming to the limitations of the domain 500 on the circulation of data.

As a result, the application server 120 of a site 100 can transfer data to another site 100 unfailingly while keeping the limitations of the domain 500 on the circulation of data. Even if some site 100 is in a domain 500 having strict limitations on the circulation of data, processing can be pursued in cooperation among a plurality of sites 100.

Meanwhile, in order to facilitate development of an application that handles data not allowed to be transferred from a site 100 while preventing such data from being transmitted from the site 100 in accordance with a data transfer policy 323 specific to the site 100, the application execution module 331 generates tag information 1511 by tracing how data is input to and output from each method (process) deployed from an application program 321 based on tagged (labeled) data and data transfer policies 323 specifying data prohibited to be transferred.

Moreover, the application execution module 331 includes a filtering determination module 332 for determining whether a processing result includes data not allowed to be transmitted to the outside of the site 100 with reference to the result of tracing (tag information 1511) and the data transfer policies 323 to be applied to the transmission path information and a filtering result reflecting module 333 for replacing data that is not allowed to be transmitted to the outside of the site 100 with dummy data based on the determination result of the filtering determination module 332. If a processing result includes data determined by the filtering determination module 332 not allowed to be transferred, the application execution module 331 sends the data after replacing it with dummy data and notifies the developer of the application program 321 of information on the data not allowed to be transferred and that the data is replaced with dummy data.

Accordingly, the developer of the application program 321 using the development server 301 does not need to interpret the laws and regulations applied to each site 100 where the application program 321 is deployed to determine the kinds of data allowed to be transmitted from the site 100 to the external. The effort to interpret the laws and regulations required in the aforementioned existing art is no longer required, which reduces the development cost of the application program 321.

This embodiment defines the time at which data passes through a border between domains 500 or sites 100 as the time to refer to the data transfer policies 323. Accordingly, the data is checked against the limitations on the circulation of data before the data sent out from a site 100 or a domain 500 to the external reaches another site 100. This configuration enables the sender site 100 to determine whether to replace data with replacement dummy data 324 before the data enters a different domain.

The above-described embodiment provides an example where the development server 301 and the application servers 120 are physical computers but they can be implemented by virtual computers or containers.

CLOSING

The computer system in the above-described embodiment can have configurations described as follows:

(1) A computer system processes data among a plurality of sites (100) each including a computer (application server 120) having a processor (413) and a memory (411). The computer (120) includes an application (application program 321) configured to perform predetermined processing on data, an execution manager (application execution program 322) configured to manage execution of the application (321), and data transfer policies (323) specifying whether data of a processing result of the application (321) is allowed to be transmitted to the external. The execution manager (322) generates information on data used by the application (321) being executed as information on data to be transmitted (tag information 1511) and applies the data transfer policies (323) to data in the information on data to be transmitted (1511) to determine whether the data to be transmitted is allowed to be transmitted to the outside of the site (100).

In transmitting or transferring data from a site 100 to another, this configuration enables readily identifying data prohibited to be transmitted to the outside of a domain 500 with the data transfer policies 323 specified to meet the limitations of the domain 500 the site 100 belongs to on the circulation of data.

(2) In the computer (120) system according to the foregoing (1), the execution manager (322) applies processing predetermined in the data transfer policies (323) to the data of the processing result of the application (321) in the case of determining that the data is prohibited to be transmitted to the external.

In transmitting or transferring data from a site 100 to another, this configuration enables automatically applying predetermined processing to data prohibited to be transmitted to the outside of the domain 500 with data transfer policies 323 specified to meet the limitations of the domain 500 the site 100 belongs to on the circulation of data.

(3) In the computer (120) system according to the foregoing (2), the predetermined processing is replacing the data with predetermined dummy data (replacement dummy data 324).

In transmitting or transferring data from a site 100 to another, this configuration enables automatically replacing data prohibited to be transmitted to the outside of the domain 500 with predetermined replacement dummy data 324 with data transfer policies 323 specified to meet the limitations of the domain 500 the site 100 belongs to on the circulation of data.

(4) In the computer (120) system according to the foregoing (3), the predetermined processing includes outputting a notification (820) indicating that data prohibited to be transmitted to the external is replaced with predetermined dummy data.

This configuration enables performing the same processing of Step 819 even if the data prohibited to be transmitted to the external is replaced in accordance with the data transfer policies 323 and further, notifying the client 800 that the data prohibited to be transmitted to the external is replaced at Step 820. The developer of the application program 321 using the client 800 can know that a processing result of the application program 321 is replaced with replacement dummy data 324 because of the limitations of the domain 500 the site 100 belongs to.

(5) In the computer (120) system according to the foregoing (1), the data transfer policies (323) are predetermined for different destinations of a processing result of the application (321).

This configuration enables limitations on data to be specified differently depending on the destination of a processing result of the application program 321.

(6) In the computer (120) system according to the foregoing (1), the outside of the site (100) is a domain in which limitations on circulation of data are different from the domain (500) the site (100) belongs to.

This configuration enables automatically controlling the circulation of data prohibited to be transferred between domains, which are countries or regions having different limitations (laws or regulations) on the circulation of data.

The foregoing disclosure describes a representative embodiment; however, a person skilled in the art will understand that various changes or modifications are available in the format or details within the spirit or scope of the disclosed subject.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A computer system configured to process data among a plurality of sites each including a computer having a processor and a memory,
wherein the computer comprises:
an application configured to perform predetermined processing on data;
an execution manager configured to manage execution of the application; and
data transfer policies specifying whether data of a processing result of the application is allowed to be transmitted to each destination in the different hierarchies, to which the computer belongs and the hierarchy of an external computer that is the destination of the transmission are pre-set,
wherein the execution manager is configured to generate information on data used by the application being executed as information on data to be transmitted, selects the data transfer policies set for each destination when the hierarchy of the destination computers is different, determines whether or not the data in the information on data to be transmitted is allowed to be transmitted outside the site, and the data is determined to be prohibited from being transmitted outside, applies the processing predetermined in the data transfer policies to the data, and
wherein the predetermined processing includes replacing the data that is determined to be prohibited with predetermined dummy data, and the predetermined dummy data is selected based on a country of the destination of the data that is determined to be prohibited.

2. The computer system according to claim 1, wherein the predetermined processing includes outputting a notification indicating that data prohibited to be transmitted to the external computer is replaced with predetermined dummy data.

3. The computer system according to claim 1, wherein the outside of the site is a domain in which limitations on circulation of data are different from the domain the site belongs to.

4. The computer system according to claim 1, wherein a user selects an optimum data transmission path for transmission of the data via a selection screen on a user interface.

5. The computer system according to claim 1, wherein the execution manager performs tag succession processing to inherit tags representing a plurality of types of the data.

6. The computer system according to claim 1, wherein the data transfer policies include a user-specific function.

7. A data control method in processing data among a plurality of sites each including a computer having a processor and a memory, the data control method comprising:
a data processing step in which the computer executes an application to perform predetermined processing on data;
an execution management step in which the computer generates information on data used by the application being executed as information on data to be transmitted;
a determination step in which the computer determines whether the data to be transmitted is allowed to be transmitted to the outside of the site with reference to data transfer policies specifying whether data of a processing result of the application is allowed to be transmitted to an external computer; and
a filtering step in which the computer applies processing predetermined in the data transfer policies to the data of the processing result of the application in a case of determining that the data is prohibited to be transmitted to the external computer,
wherein the data transfer policies are predetermined for different destinations of a processing result of the application, and
wherein the predetermined processing includes replacing the data that is determined to be prohibited with predetermined dummy data, and the predetermined dummy data is selected based on a country of the destination of the data that is determined to be prohibited.

8. The data control method according to claim 7, wherein the predetermined processing includes outputting a notification indicating that data prohibited to be transmitted to the external computer is replaced with predetermined dummy data.

9. The data control method according to claim 7, wherein the outside of the site is a domain in which limitations on circulation of data are different from the domain the site belongs to.

10. A non-transitory computer-readable storage medium storing a computer program configured to control data in processing data among a plurality of sites each including a computer having a processor and a memory, the computer program being configured to make the computer perform steps including:
a data processing step of executing an application to perform predetermined processing on data;
an execution management step of generating information on data used by the application being executed as information on data to be transmitted; and
a determination step of determining whether the data to be transmitted is allowed to be transmitted to the outside of the site with reference to data transfer policies specifying whether data of a processing result of the application is allowed to be transmitted to an external computer; and
a filtering step in which the computer applies processing predetermined in the data transfer policies to the data of the processing result of the application in a case of determining that the data is prohibited to be transmitted to the external computer,
wherein the data transfer policies are predetermined for different destinations of a processing result of the application, and
wherein the predetermined processing includes replacing the data that is determined to be prohibited with predetermined dummy data, and the predetermined dummy data is selected based on a country of the destination of the data that is determined to be prohibited.

* * * * *